United States Patent [19]
Morgan et al.

[11] Patent Number: 5,748,706
[45] Date of Patent: May 5, 1998

[54] EMERGENCY SIGNAL DISPLAY ACTIVATION SYSTEM

[76] Inventors: Samuel D. Morgan, 1415 Palmer Dr., Blacksburg, Va. 24060; Allen J. Jones, 304 Brittany La., Salem, Va. 24153

[21] Appl. No.: 664,182

[22] Filed: Jun. 14, 1996

Related U.S. Application Data

[60] Provisional application No. 60/000,234, Jun. 15, 1995.

[51] Int. Cl.[6] .................................................. H04M 11/04
[52] U.S. Cl. ........................ 379/37; 379/386; 379/396; 340/332; 340/310.01
[58] Field of Search .............................. 379/36–38, 40, 379/45, 49, 51, 66, 102, 104, 105, 188, 199, 200, 354, 386, 396; 340/331, 332

[56] References Cited

U.S. PATENT DOCUMENTS

| | | | |
|---|---|---|---|
| 3,911,425 | 10/1975 | Muncheryan | 340/326 |
| 4,058,678 | 11/1977 | Dunn et al. | 379/66 |
| 4,878,236 | 10/1989 | Ray et al. | 379/37 |
| 4,931,780 | 6/1990 | Lamont et al. | 340/691 |
| 4,935,951 | 6/1990 | Robinson et al. | 379/37 |
| 4,993,058 | 2/1991 | McMinn et al. | 379/37 |
| 5,012,507 | 4/1991 | Leighton et al. | 379/37 |
| 5,233,646 | 8/1993 | Kuromi | 379/102 |

*Primary Examiner*—Wing F. Chan
*Attorney, Agent, or Firm*—Sheldon H. Parker

[57] ABSTRACT

An emergency locator light can be located based on an optimum viewing of the light, rather than being limited by hard wiring limitations. The apparatus responds to dialing of a predetermined emergency telephone number, such as 911. A light switching mechanism is provided for activating the emergency light upon receipt of a signal code from a signal code generator. The signal code is transmitted when the system detects the dialing of a predetermined emergency number. The apparatus detects the transition from either on-hook voltage to off-hook voltage or off-hook voltage to on-hook voltage, or both, in order to set and reset the dialing monitor unit. The apparatus, when set, detects the dialing of the emergency phone number. Upon detection of the emergency number a signal code is transmitted to the light switching member. The signal can be transmitted by a wireless transmitter, such an RF or microwave frequency transmitted. Alternatively, it can transmit signal pulses on household electric power lines, from the signal generator to the signal member switch. The signal member switch includes signal pulse responsive means to activate the emergency locator signal member when it receives a predetermined signal pulse sequence.

16 Claims, 4 Drawing Sheets

EMERGENCY SIGNAL DISPLAY ACTIVATION SYSTEM

BACKGROUND OF THE INVENTION

1. Cross Reference to Related Application

This application is a continuation-in-part of provisional application Ser. No. 60/000,234, filed Jun. 15, 1995, the disclosure of which is incorporated herein by reference, as though recited in full.

2. Field of the Invention

The invention relates to an automatic emergency locator system associated with a conventional telephone line in such a manner that control of the emergency locator does not require special cable connection or hardwiring between the phone and the locator.

3. Brief Description of the Prior Art

In the event of an emergency, it is crucial that police, fire, and rescue squads be able to locate those in need of assistance as quickly as possible. The "911" telephone system aids in this quick response by telling the emergency dispatcher the address of the caller. Having the address of the caller is only one of the things that is needed in order for emergency personnel to locate those in need of assistance though. Even with the address in hand, it is still difficult to locate those in need of assistance. Often it is difficult to find a particular address. This may be because no addresses are marked on the buildings, because the sheer number of signs in the area makes finding an address sign difficult, or because of any of a number of reasons. Various products have been developed in order to make it easier for emergency personnel to locate an address. These include such things as strobe lights, horns, sirens, etc. The idea behind these devices is that after calling for help, the caller would manually turn on these devices in order to help direct emergency personnel to where help is needed. This approach suffers from several shortcomings.

1. It depends upon the caller knowing that the building that they are calling from is equipped with one of these locating aids.

2. It depends upon the caller knowing how to turn the locating aid on.

3. It depends upon the caller remembering, in a high stress situation, that they need to turn the locating aid on.

It is apparent that there are many reasons that the strobe light, horn, siren, etc., may not get turned on when it is needed. An approach which has been suggested to overcome the aforenoted problem has been to automate the action of the emergency notification mechanism.

In U.S. Pat. No. 4,935,951 the emergency signal light system is actuated by the dialing of an emergency telephone number. The emergency signal light is visible externally of the building in which it is installed. The system includes a device for detecting the numbers being dialed on a standard telephone line, and microcontroller means for comparing the detected numbers with a stored number and emitting an actuation signal upon detection of a match. The light signal means is actuated by the actuation signal from the microcontroller device. The light signal device is actuatable by an output signal from the microcontroller. The microcontroller is wired directly to the microcontroller.

U.S. Pat. No. 4,878,236 discloses another mechanism for actuating a remote emergency signal mechanism. The electronics apparatus used to detect the entry of an emergency indicating phone number is connected by a wire to the remote indicator 93 of FIG. 1.

U.S. Pat. No. 4,931,780 discloses an emergency phone number responsive system which, upon detection of the emergency signal from the phone, closes a switch 46 which connects the DC power output contact of the relay 43 to the coil of a relay 29 within the remote alarm unit 12. The patent indicates that U.S. Pat. No. 3,911,425 discloses a system in which the remote emergency indicator is operated by manually turning on an emergency switch or by an automatic wireless switching device using a microwave transmitter receiver.

BRIEF DESCRIPTION OF THE DRAWINGS

The advantages of the instant disclosure will become more apparent when read with the specification and the drawings, wherein.

SUMMARY OF THE INVENTION

The devices of the prior art exhibit shortcoming such as, the emergency display device having to be near the telephone because of the need to "hard-wire" the telephone number sensing device and the display device, the system being applicable to a single phone, particularly where the display device and the telephone number sensing device must be hard-wired, location of the display device outside of the house requiring a custom wiring connection, or a costly microwave system be required. The shortcomings of the prior art are overcome through the use of the present invention, in which a signal is carried by the normal house AC wiring lines, and a signal sensor is located in the emergency display device for turning the display device on and off.

Through the use of the invention, the emergency display device can be located based on an optimum viewing of the display device, rather than being limited by hard wiring limitations.

The apparatus for use in automatically activating an emergency locator signal light provides for the automatic response to dialing of a predetermined emergency telephone number, such as 911. The emergency locator signal member is preferably a light and most preferably is a strobe light. Additionally, an audible alarm can be employed. A switch mechanism is provided for activating the emergency light upon receipt of a signal code from a signal code generator. The telephone line has a first low voltage corresponding to an off-hook condition and a second high voltage corresponding to an on-hook condition. The apparatus includes a voltage detection means for detecting the transition from either on-hook voltage to off-hook voltage or off-hook voltage to on-hook voltage, or both. Alternatively, the apparatus can monitor the line voltage and be activated by sensing off-hook voltage, and reset when on-hook voltage is detected. The apparatus, when set, detects the dialing of of a predetermined sequence of digits, as for example, 911.

Upon the detection of the predetermined sequence of digits, a signal code generating member generates a predetermined signal code. The signal code from the signal code generating member is transmitted to the signal member switch member. The signal can be transmitted by a wireless transmitter, such an RF or microwave frequency transmitted. Alternatively, it can transmit signal pulses on household electric power lines, from said signal generator to said signal member switch. The signal member switch includes signal pulse responsive means to activate the emergency locator signal member when it receives a predetermined signal pulse sequence.

The detection of the dialing of digits can be terminated upon the dialing of a third digit, where the emergency number is a three digits number. The system can be reset at this point if the detected digit sequence does not match the emergency number. However, it is preferred to reset when the phone is going on-hook. While the system can look for the on-hook voltage for activation, it is more obvious to have the resetting activated by the presence of the off-hook voltage. Monitoring for off-hook voltage or the on-hook to off-hook voltage transition, enables one to employ a mechanism to disregard noise associated with picking up a phone. Using the on-hook transition, does not provide information as to the point in time when the phone is brought into use. This capability is essential with rotary dial systems. It has now been found that a reliable system can be obtained which employs on-hook detection for activation, by eliminating the rotary dialing capacity in the system.

DETAILED DESCRIPTION OF THE INVENTION

An essential feature of the emergency system of the present invention is that the caller does not need to remember to turn on the system for displaying the location at which aid is required. The caller does not even need to know that the building is equipped with a locating aid. The device connects to the telephone line and monitors the telephone numbers being dialed. Any time someone picks up a telephone that is connected to the same line and dials "911," the device will automatically turn on the locating aid.

The device works in the following way. If a telephone line is not currently in use, the voltage on the line will be approximately 42 Volts. When a caller picks up a telephone, the telephone line voltage will drop to approximately 8 Volts. The 911 Interface detects this drop in line voltage and begins to look for the user to dial a telephone number. If the caller is using a Touch Tone phone, then the 911 Interface will decode the tones on the line to determine what number is being dialed. The technical term for Touch Tone is Dual Tone Multiple Frequency or DTMF. The 911 Interface can also decode a number being dialed from a rotary phone. It does this by monitoring the telephone line for the voltage variations that are characteristic of rotary dialing. It is not necessary to set the 911 Interface up in any certain manner in order to detect either Touch Tone or rotary dialing. The 911 Interface monitors for both types of dialing at all times.

After the caller has dialed three digits, the 911 Interface checks the number that was dialed to determine if it was "911." If the first three digits were not "911," then the 911 Interface goes into standby mode until the caller hangs up the phone. If the first three digits were "911," then the 911 Interface turns on the emergency locating aid.

Once the 911 Interface determines that "911" has been dialed, there are several ways that could be used to turn on the emergency locating aid. The simplest method from a technical standpoint would be to have the 911 Interface directly control a relay. The relay would apply power to the strobe light, siren, etc. The disadvantage of this method is that it requires the user to either locate the 911 Interface at the same point as the locating aid, or it requires the user to run wires between the 911 Interface and the locating aid thereby economically limiting the freedom to select a location for the locating display.

Advantageously, a signal is sent through the house wiring. A transmitter and receiver is available from retailers such as Radio Shack, under the trademark Plug'n Power. Additionally, transmitters and receivers have been sold by Anova Corporation. It should be understood that other protocols can be used. The signal is then received by an X-10 type receiver module. When the 911 Interface determines that the locating aid needs to be turned on, it sends out a "Device On" command. The 911 Interface has two rotary switches that are used to set the "House Code" and "Unit Number" for the device that is to be turned on. The house code and unit codes are sent by the device over the AC power lines in the house.

The receivers are set to the same house code and thus are able to coordinate with the sending units. The unit code is the code which can be used to identify a particular device. In multiple family dwellings, it is possible for two or more family units to share common AC lines. The house code enables the system to be customized for a particular family unit and the unit code selects the particular device which is to be activated.

When the 911 Interface sends out the "Device On" command any receivers that are set to the same House Code and Unit Number will turn on. This in turn activates the locating aid.

A typical installation would consist of the following steps:

1. Plug the 911 Interface into any unswitched AC outlet that is located near a telephone jack.

2. Plug a telephone cord into the 911 Interface and into the telephone jack.

3. Either plug the locating aid into an X-10 receiver and then plug the X-10 receiver into a convenient unswitched AC outlet, or 4. Wire the locating aid into an X-10 receiver and then wire the X-10 receiver to a convenient unswitched AC circuit.

5. Test out the unit by dialing "911."

The foregoing five steps represent a complete operation. From this point on, the 911 Interface will monitor the telephone line. If anyone picks up a telephone connected to the same line and dials "911," the strobe light siren, or other device connected to the X 10 receiver will turn on to help emergency personnel locate the caller.

It should be noted that the 911 Interface will turn on if the user dials "911" or "119." "119" is acted upon so that the user can test the 911 Interface without actually calling the 911 emergency operator.

Telephone Interface for the Life Light Basic Problem Description

A product is needed that will turn on the Life Light whenever a person dials 911 from either a touch-tone or rotary dial telephone. The 911 detection circuitry and the Life Light may be connected in several ways. Possible configurations are a single integrated unit, two units that are hard wired together with a low voltage control line, two units that are connected via a switched power connection, two units that are connected via a radio link, and two units that are connected via and X-10 link. Block diagrams for each of these configurations is shown below.

911 Interface Circuitry Description

Figure 1:
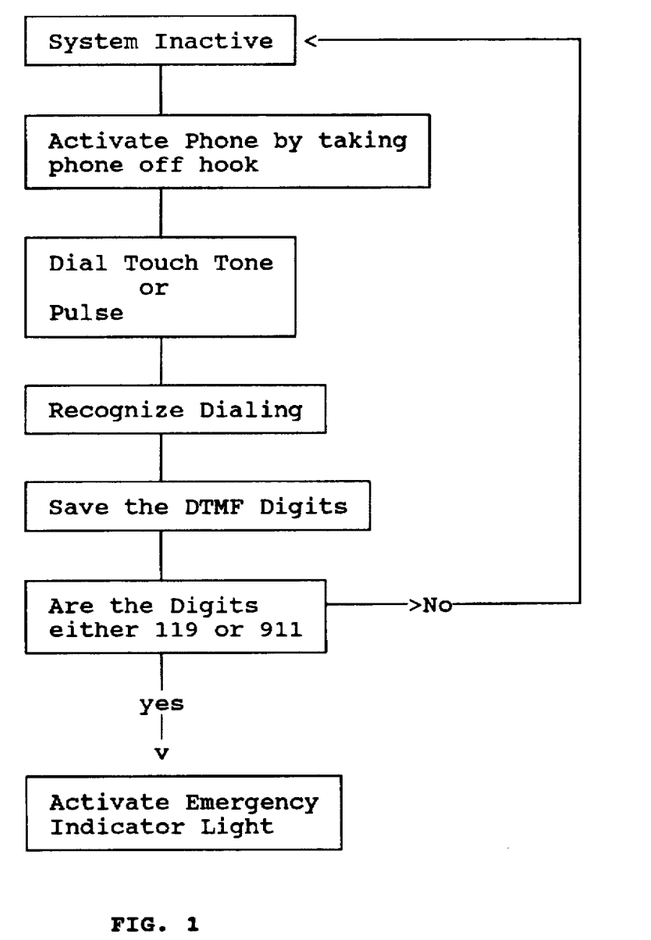
FIG. 1 is a block diagram showing a typical operation in accordance with the instant invention.
Figure 2:
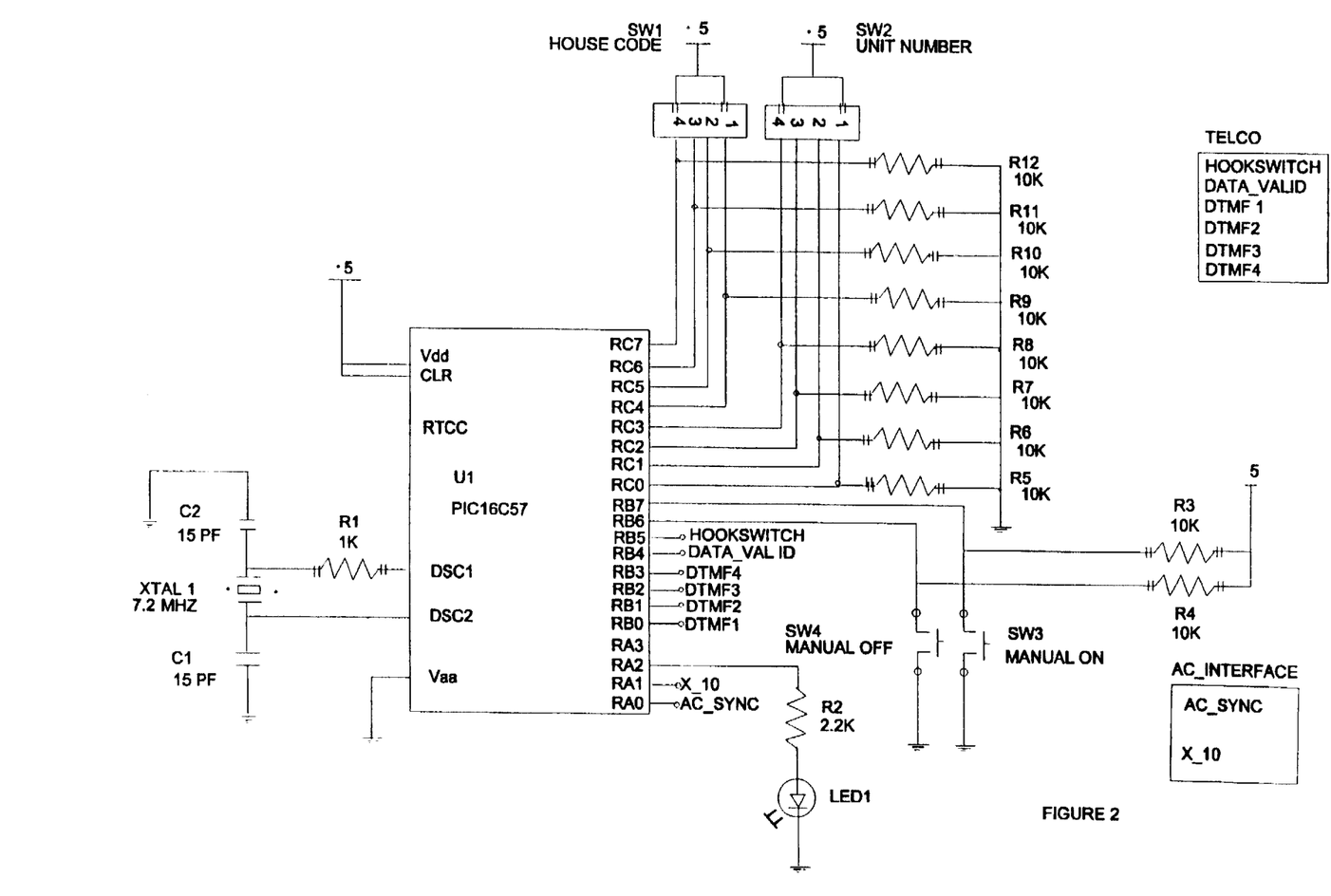
FIG. 2 is a wiring diagram of the basic microcontroller core of the interface device.

FIG. 1 shows the basic flow of the operation of the system of the invention and FIG. 2 illustrates the basic microcontroller core of the 911 Interface. The major component is U1 —the PIC16C57. This is a single chip microcontroller made by Microchip. It contains its own internal RAM and ROM and also has several peripheral ports (RA0-3, RB0-7, and RC0-7). Peripheral ports RC0-7 connect to switches SW1 and SW2. These are both 16 position rotary DIP switches. These switches are used for setting the House Code and Unit number that are needed by the X-10 protocol. Peripheral ports RB7 and RB6 connect to the Manual On and Manual Off switches. These two switches can be used to cause the 911 Interface to manually turn on or off the strobe light or other emergency locating aid. Peripheral port RA2 connects to the heartbeat LED. This is used to provide an indication to the customer that the 911 Interface is operational. When the telephone is on-hook, this LED flashes at a rate of about once every two seconds. When the telephone is off-hook or if the telephone line is disconnected, this LED flashes at a rate of about twice a second. When the 911 Interface sends a command to turn the locating aid on or off, this LED turns on solid and then returns to flashing. If this LED stays on or off continuously, then it is an indication that the 911 Interface is not operational. The remaining peripheral port pins are tied to circuitry of FIGS. 3 and 4.

Figure 3:
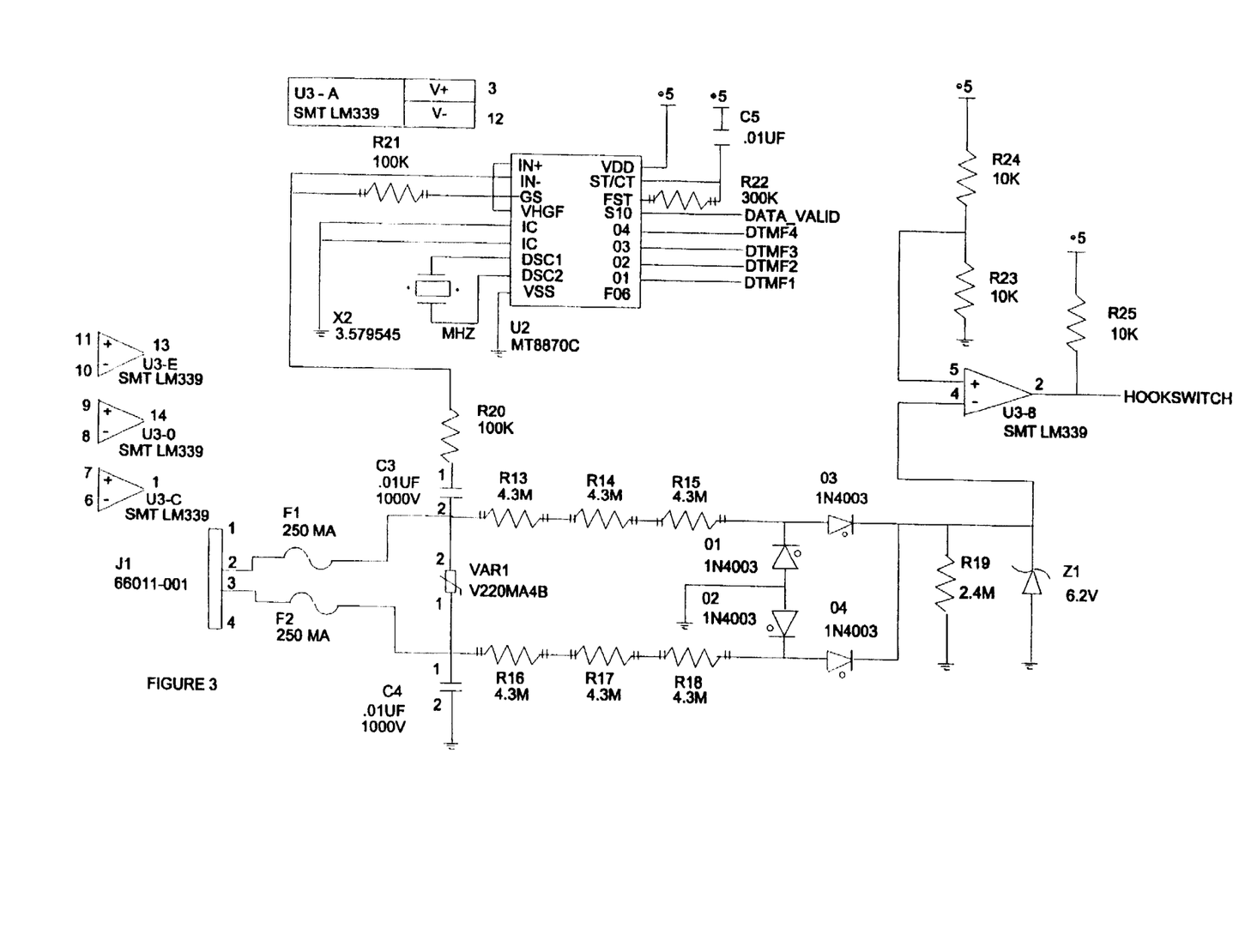
FIG. 3 is a wiring diagram of the telephone interface circuitry.

FIG. 3 illustrates the circuitry that interfaces to the telephone line. The telephone line connects to telephone jack J1. From this point, the telephone line connects to two different circuits. The first circuit is used to detect whether the telephone is on-hook or off-hook and to monitor rotary dialing. This circuit consists of resistors R13–19 and R23–25, diodes D1–D4, zener Z1, and comparator U3-B. Resistors R13–19 make up a high impedance voltage divider network. The high impedance is needed in order to limit the DC Ringer Equivalence for FCC purposes. Multiple resistors in series (R13–R15 and R16–R18) are used instead of two higher ohmage resistors because these resistors must withstand the dielectric stress of the FCC transient tests. Using multiple resistors in series reduces the stress on each individual resistor. D1–D4 make up a bridge so that the circuit will work even if the telephone line polarity is reversed. Zener Z1 is present for protection purposes. The remainder of the circuit forms a comparator that will have a logic low output when the telephone is on-hook. The comparator will have a logic high output when the telephone is off-hook. It will also have a logic high if the telephone line is disconnected. The output of the comparator will toggle between a logic high and a logic low if the user is rotary dialing. During rotary dialing the output wizll start out high (telephone off-hook). It will then pulse low between 1 and 10 times depending upon the digit that was dialed. The output of this comparator connects to peripheral port FB5 of the PIC16C57 of FIG. 2. By monitoring this line, the PIC16C5? can determine when the telephone has been picked up or put down and what number was dialed using rotary dialing.

FIG. 3 shows the Dual Tone Multiple Frequency (Touch Tone) detection circuitry. This circuit consists of DTMF decoder chip U2, resistors R20–22, crystal X2, and capacitors C3–5. C3–4 and R20–21 couple the DTMF signals that are generated by DTMF dialing into the decoder chip. Whenever a valid DTMF digit has been detected, the decoded digit is output to DTMF1–4 of this chip and the DATA_VALID output goes high. These signals connect to peripheral ports RB0-4 of the PIC16C57. By monitoring this line, the PIC16C57 can determine what number was dialed using DTMF dialing. Advantageously, the system detects the hanging up of the phone.

Figure 4:
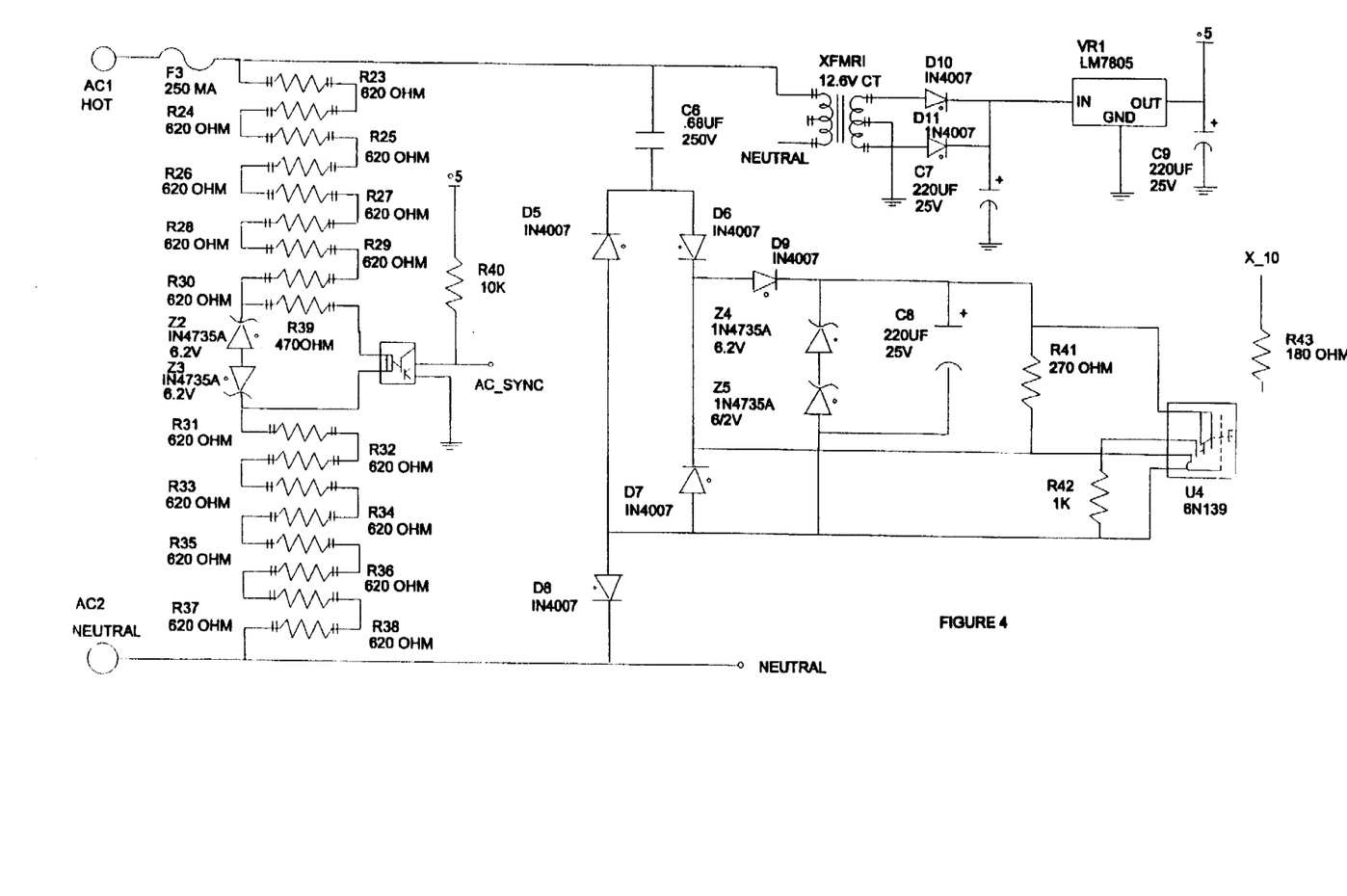
FIG. 4 is a wiring diagram of the power line interface circuitry.

FIG. 4 shows the power line interface circuitry for the 911 Interface. This circuitry consists of three sub-circuits. They azre the power supply circuit, the AC Sync circuit, and the X-10 transmitter circuit. The power supply consists of varistor VAR2, transformer XFMR1, rectifier diodes D10–11, filter capacitors C7 and C9, and voltage regulator VR1.

The AC Sync circuit of FIG. 4 consists of resistors R23–40, zener diodes Z2–3, and optoisolator U5. Multiple resistors are used in series for R23–38 to keep from exceeding the ⅛ Watt rating of the surface mount resistors. Zeners Z2–3, resistors R39–40, and optoisolator U5 form a circuit that creates a high pulse on the AC_SYNC output every time there is a zero crossing of th AC power line. This signal connects to peripheral port RA0 of the PIC16C57 and is used to synchronize the X-10 protocol transmissions.

The final circuit that appears in FIG. 4 is the X10 transmitter circuit. An explanation of the X-10 protocol follows. The X-10 protocol is a fairly commonly used protocol for controlling devices by sending commands over a house's AC wiring. X-10 transmitters and receivers are readily available from X-10, Radio Shack and other sources. The X-10 protocol allows for up to sixteen House Codes and sixteen Unit Numbers. This allows multiple users to control multiple devices in the same AC power line area without conflicting with each other. The X-10 transmissions consist of alternating bursts of 120 KHz signals and periods of silence. These 120 KHz bursts are injected onto the AC power line where they are detected and acted upon by X-10 receivers. The X-10 commands have the following format:

<Sync Signal><House Code><Unit Number>0<Sync Signal><House Code><Unit number>0 <<Sync Signal><House code><Command><1<Sync Signal><House code><command>1

The Sync Signals and binary digits are transmitted as shown below, where "XX" represents a 120 KHz burst and ". . ." represents a period of silence.

```
AC line      ⎯⎯⎯⎯⎯⎯⎯⎯⎯⎯⎯⎯⎯⎯⎯⎯⎯⎯⎯⎯⎯⎯⎯⎯⎯⎯⎯

Sync Signal  XX..XX..XX..XX..XX..XX..XX..XX..XX............
BINARY 0     ............ XX..XX..XX..
BINARY 1     XX..XX..XX..............
```

The values that are used for the House Codes, Unit Numbers, and Commands, are as follows:

| Binary Value Transmitted | House Code | Unit Number | Command |
| --- | --- | --- | --- |
| 0110 | A | 1 | |
| 1110 | B | 2 | |
| 0010 | C | 3 | UNIT ON |
| 1010 | D | 4 | |
| 0001 | E | 5 | HOUSE CODE ALL ON |
| 1001 | F | 6 | |
| 0101 | G | 7 | UNIT BRIGHTEN |
| 1101 | H | 8 | |
| 0111 | I | 9 | |
| 1111 | J | 10 | |
| 0011 | K | 11 | UNIT OFF |
| 1011 | L | 12 | |
| 0000 | M | 13 | HOUSE CODE ALL OFF |
| 1000 | N | 14 | |
| 0100 | O | 15 | UNIT DIM |
| 1100 | P | 16 | |

When the 911 Interface determines that the locating aid needs to be turned on, it sends out a "DEVICE ON" command. The 911 Interface has two rotary switches that are used to set the "HOUSE CODE" and "UNIT NUMBER" for the device that is to be turned on. When the 911 Interface sends out the "DEVICE ON" command, any receivers that are set to the same HOUSE CODE and UNIT NUMBER, will turn on. This in turn activates the locating aid.

The X-10 transmitter circuit consists of capacitors C6 and C8, diodes D5–D9, zeners Z4 and Z5, optoisolator U4, and resistor R41. The diodes, capacitors, and zeners form a basic power supply for optoisolator U4. The X-10 signal connects to peripheral port RA1 of the PIC16C57. This signal is normally low. This means that the optoisolator is normally turned off. When the PIC16C57 needs to transmit an X-10 command over the power line, it toggles the X-10 signal at a 120 KHz rate. This causes the optoisolator to turn on and off at the same rate and inject the desired signal onto the AC power line through diodes D5–8 and capacitor C6. Diode D9 prevents this signal from making its way back to capacitor C8. This allows capacitor C8 to continue providing the optoisolator with a reasonably constant supply voltage, during the X-10 transmission.

To summarize, the 911 Interface tracks the telephone line using the circuits shown in the Figures and the algorithms described herein. When it determines that the user has dialed "911" it sends out the X-10 Device On command. This signal is transmitted over the AC power line using the X-10 protocol and the circuits of FIGS. 2 and 4.

In another embodiment, the X-10 protocol or an equivalent protocol, can be transmitted with a radio frequency transmitter, and received on a radio frequency receiver, where the protocol is acted upon, as previously described.

The procedure for determining whether the 911 emergency code has been dialed, can take a variety of forms. The system can respond to a low line voltage which signifies an off hook condition. The system can thereafter look for the first three numbers dialed and respond if the numbers are 911. If the required condition is off-hook combined with 911, the system can distinguish between 911 being the lead numbers and being a part of a telephone number, such as 979-1123, 791-1234, or the like. Elimination of off-hook detection, can raise several problems, primarily due to miss-dialing. The dialing of a number such as 914-555-5591 erroneously, hanging up and redialing 1-914-555-5591, would provide the numbers 911 in sequence. The system must then distinguish between 911 as part of a number and the sequence 911 as an emergency code, or suffer false hits. The number of false hits will be zero where the combination is off-hook followed by 911. The false hits will be excessively high if the system is always activated by the 911 whether part of a number or a stand alone number. The number of false hits can be reduced by timing the period between the entry of numbers. Thus, the dialing of a wrong number, followed by hanging up and redialing would generate a delay between the dialing of the two numbers. The system can be set to accept 911 and a dead time where there is a predetermined period in which no number has been entered. False hits could be generated by an extremely rapid dialing of the two sets of numbers or by dialing so slowly, that the system would incorrectly recognize the 911 as lead numbers. The timed system would reduce the number of false hits to a reasonable level and would be primarily associated with unusual dialing characteristics. Computer technology makes it practical to distinguish between slow dialing and rapid dialing sequences and to thereby distinguish between a rapid dialing of a wrong sequence rapidly followed a rapidly dialed correct sequence. Where the dialing pattern is rapid, the system can employ a dead time by which to recognize 911 as leading, stand-alone numbers.

Conversely, where the dialing pattern is extremely slow, the system can require an extended time period to distinguish between two different sets of phone numbers. This will further reduce the number of false hits to an even more acceptable level. Additionally, the system can look to the entry of trailing numbers after the 911 sequence as a further mechanism of rejecting false hits. This system would distinguish between 999-9112 as a false hit and 911 as a correct hit, but would not reject a number such as 999-9911 as a false hit. The use of the combination of timing the rate of dialing, rejecting entered numbers which are not entered within a determined time period and rejecting the entry of 911 when it is followed by a subsequent number, serves to reduce the potential for false hits to a minor amount. Where a false hit does trigger the emergency light system, the user simply turns off the light. It is advantageous for the system to announce the activation of the emergency light by an audible signal, such as a beep, or a series of beeps. In this manner, the user is either becomes aware of a false hit or is assured that the system has recognized the entry of 911. In the absence of an audible signal on the phone line, the user must check the light to see that it is on, which is an undesirable requirement in an emergency environment.

Another mechanism for distinguishing between true hits and false hits, is to have the system respond to the transition from the high on-hook voltage to the low off-hook voltage. The transition from high to low voltage indicates that the next sequence of numbers are the first numbers being dialed. Accordingly, the system compares the first three numbers with the code signifying an emergency, as for example the dialing of 911. The advantage of responding to an on-hook off-hook transition, over merely periodically monitoring for an off-hook condition, is that the transition point is a single point in time which indicates the critical fact of the system having been just turned on.

Advantageously, the system responds to both the on-hook to off-hook voltage drop, as well as to the off-hook to on-hook voltage rise. By responding to both voltage transitions, the system reliably responds to the hanging up of the phone. Alternatively, the circuitry can respond to the on-hook condition for a period of time, as for example about 18 milliseconds, after which the detection circuitry is reset. The circuitry stays reset until the off-hook condition is detected. Once the phone goes off-hook, there is a time delay, of for example, about 18 milliseconds to let the line settle. On-hook conditions or DTMF tones during this period are ignored on the basis that they are merely noise.

Off-hook detection can be eliminated by using the on-hook state to both reset and set the detection circuitry. In this system, after about 18 milliseconds, the system would respond to the user hanging up by resetting. Detection of dialing would have to be carried out during the subsequent period, even though the telephone was on-hook, because of the absence of off-hook detection. While this system has the advantage of eliminating one step, it requires a mechanism for rejecting noise on the line during the on-hook state. Timing circuits, as previously noted, can be used to distinguish between random noise and true signals which are produced by the dialing of a phone number. The system would ignore all signals after the dialing of a third number. The detection would remain disabled until the on-hook condition reset the system. Merely responding to the dialing of three numbers, without looking for an on-hook condition, fails to distinguish between the dialing of 91 hanging up and the subsequent dialing of 1-914. The system would see an off-hook state followed by three numbers, 9-1-1. The use of on-hook detection eliminates false hits due to the dialing sequence of

```
            - off-hook,
               91,
            on-hook,
            -off-hook,
             1-914 -.
```

It is thus seen that on-hook detect operates differently from off-hook detection and is a different mechanism. The combination of detection of both the off-hook state and the on-hook state, is noted to have certain advantages. As compared to monitoring an on-hook and/or off-hook state, setting or resetting of the system in response to the transition from one state to the other is most preferred. The circuitry responds directly to the voltage rise and/or fall, and thus periodic monitoring of the voltage level is not required. Additionally, the time period immediately following the transition to off-hook is critical, since dialing can occur immediately, and noise in the roughly, first 18 milliseconds should be ignored. Monitoring the line voltage, by way of contrast, can result in missing a first number or misreading the number if the time period between voltage readings is too long. Thus, responding to the transition from one state to another provides direct, meaningful data. By way of contrast, monitoring for an off-hook state, is the indirect mechanism for obtaining knowledge that the system must respond to a series of numbers. Since the system is time sensitive, the direct response to the condition transition is more reliable than reading voltages at predetermined time intervals.

An alternate mechanism for rejecting noise is to employ tone detection, and to remove the rotary dial detection capability. This serves to circumvent the problem by restricting the operation of the system, rather than by overcoming the problem.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. A system for use in automatically activating an emergency locator signal member in response to dialing of a predetermined emergency telephone number, comprising:
    a) an emergency locator signal member;
    b) signal member switch means for activating said emergency locator signal member upon receipt of a signal code from a signal code generating means;
    c) a telephone line, said telephone line having a first low voltage corresponding to an off-hook condition, and a second high voltage corresponding to an on-hook condition;
    d) voltage detection means for detecting the transition from at least one of said on-hook voltage to off-hook voltage and off-hook voltage to on-hook voltage,
    e) digit detecting means for detecting the dialing of a predetermined sequence of digits;
    f) signal code generating means for generating a predetermined signal code in response to the detection of the dialing of a predetermined sequence of digits;
    g) transmission means for transmitting said signal code from said signal code generating means to said signal member switch means.

2. The system of claim 1, wherein said transmission means is a signal generator and transmits signal pulses on household electric power lines, from said signal generator to said signal member switch, and said signal member switch includes signal pulse responsive means to activate said emergency locator signal member when it receives a predetermined signal pulse sequence.

3. The system of claim 1, wherein said transmission means is a signal generator and transmits a radiation signal, from said signal generator to said signal member switch, and said signal member switch includes radiation signal pulse responsive means to activate said emergency locator signal member when it receives a predetermines signal pulse sequence.

4. The system of claim 3, wherein said radiation signal is a radio frequency signal.

5. The system of claim 3, wherein said radiation signal is a microwave frequency signal.

6. The system of claim 1, wherein said emergency signal member is a strobe light.

7. The system of claim 1, wherein said voltage detection means is responsive to the transition from off-hook voltage to on-hook voltage.

8. A system for use in activating an emergency locator light in response to dial a predetermined telephone number, comprising:
    a) an emergency signal member;
    b) signal member switch means for activating said emergency signal member upon receipt of a signal code from a signal code generating means;
    c) emergency telephone number detection means for detecting the dialing of a predetermined sequence of digits representing an emergency telephone number;
    d) signal code generating means for generating a predetermined signal code in response to the detection of the dialing of a predetermined sequence of digits;
    e) transmission means for transmitting said signal code from said signal code generating means to said signal member switch means, said transmission means being a signal generator transmitting signal pulses on household electric power lines, from said signal generator to said signal member switch, and said signal member switch includes signal pulse responsive means to activate said emergency locator signal member when it receives a predetermined signal pulse sequence.

9. A method of automatically activating an emergency locator signal member in response to the dialing of a predetermined telephone number, comprising the steps of:
    a) setting a digit detecting means to the ready state for detecting the dialing of a predetermined sequence of digits;
    b) detecting the dialing of a predetermined sequence of digits;
    c) activating signal code generating member and generating a predetermined signal code in response to the detection of the dialing of said predetermined sequence of digits;
    d) transmitting said generated signal code from said signal code generating member to signal member switch means;
    e) upon receipt of said generated signal code, automatically activating said signal member switch means
    f) activating said emergency locator signal member upon the activation of said signal member switch means.

10. The method of claim 9, further comprising transmitting signal pulses on household electric power lines, from said signal generator to said signal member switch means, and activating said signal member switch means upon receipt of a predetermined signal pulse sequence.

11. The method of claim 10, wherein setting said digit detecting means to the ready state for detecting the dialing of a predetermined sequence of digits comprises detecting an on-hook state of said telephone line.

12. The method of claim 10, wherein setting said digit detecting means to the ready state for detecting the dialing of a predetermined sequence of digits comprises detecting an off-hook state of said telephone line.

13. The method of claim 11, wherein setting said digit detecting means to the ready state for detecting the dialing of a predetermined sequence of digits comprises detecting an off-hook state of said telephone line and further comprising resetting said digit detecting means upon detection of an on-hook state and wherein said dialing is tone dialing.

14. The method of claim 9, wherein setting said digit detecting means to the ready state for detecting the dialing of a predetermined sequence of digits comprises setting said digit detecting means in response to transition from on-hook high voltage to off-hook low voltage.

15. The method of claim 14, further comprising resetting said digit detecting means in response to transition from off-hook low voltage to on-hook high voltage.

16. The method of claim 9, wherein setting said digit detecting means to the ready state for detecting the dialing of a predetermined sequence of digits comprises setting said digit detecting means in response to transition from off-hook high voltage to on-hook low voltage.

* * * * *